United States Patent [19]
Ward

[11] Patent Number: 5,971,032
[45] Date of Patent: Oct. 26, 1999

[54] APPARATUS AND METHOD FOR THE ROBOTIC REPAIRING OF AN UNDERGROUND PIPE JUNCTION

[75] Inventor: Robert M. Ward, Glenwood Springs, Colo.

[73] Assignee: Tele Environmental Systems, Glenwood Springs, Colo.

[21] Appl. No.: 09/196,607

[22] Filed: Nov. 20, 1998

[51] Int. Cl.$^6$ .................................................. F16L 55/16
[52] U.S. Cl. .............................. 138/98; 138/97; 156/287; 264/269
[58] Field of Search .................... 138/98, 97; 405/150.1; 156/287; 264/267, 269

[56] References Cited

U.S. PATENT DOCUMENTS 4,724,108  2/1988  Jurgenlohmann et al. ............ 138/98 X
5,040,922  8/1991  Himmler ............................... 138/97 X

FOREIGN PATENT DOCUMENTS 550860  7/1993  Germany ................................. 138/98

Primary Examiner—Patrick Brinson
Attorney, Agent, or Firm—Sheridan Ross P.C.

[57] ABSTRACT

An apparatus and method for sealing an underground junction between a lateral service line and a main pipeline from the inside-out. One embodiment provides a substantially rigid patching apparatus which may be positioned and installed with a robotic device within a main pipeline. The patching apparatus has a flange shaped to fit the internal diameter of the main pipeline and a tubular stem or sleeve which penetrates into the lateral service line. The patching apparatus contains an interconnection substrate such as felt, sponge or other similar material. The interconnection substrate may be impregnated with a bonding agent which sealingly interconnects the patching apparatus to the main pipeline and lateral service line. The seal provided by the inverted-tee patch effectively eliminates most water intrusion or the influx of plant roots and other matter which can seriously damage or obstruct the main pipeline. A remote control robotic arm is used in conjunction with a support cage to apply the patch to the underground junction between the main pipeline and lateral service line from within the main pipeline.

25 Claims, 2 Drawing Sheets

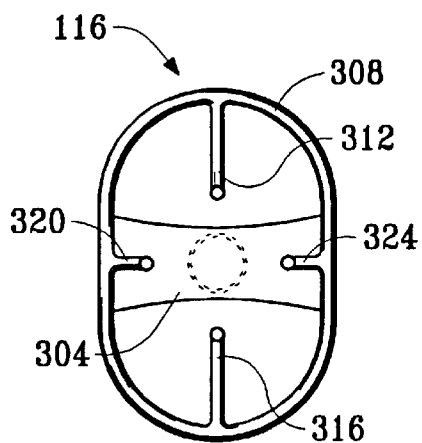
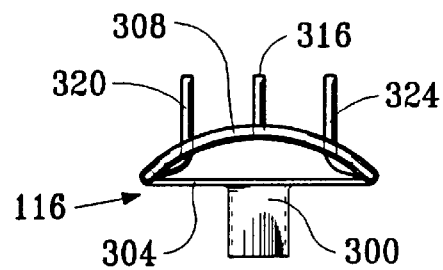
FIG. 3
FIG. 4
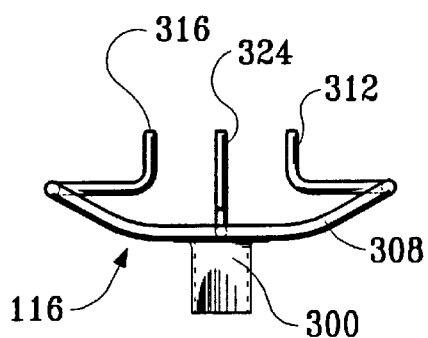
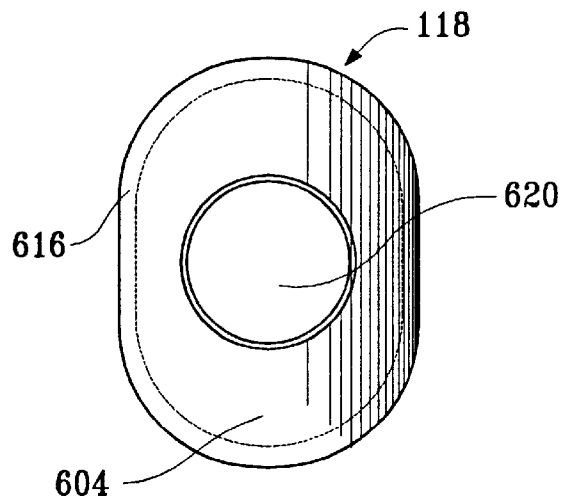
FIG. 5
FIG. 6
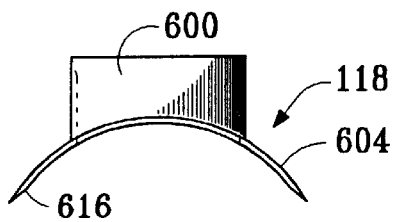
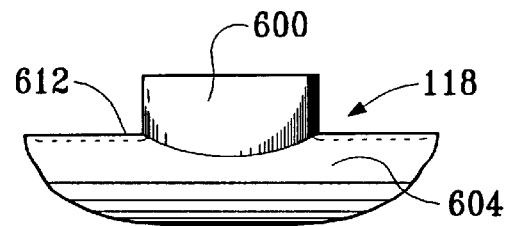
FIG. 7
FIG. 8

APPARATUS AND METHOD FOR THE ROBOTIC REPAIRING OF AN UNDERGROUND PIPE JUNCTION

FIELD OF THE INVENTION

This invention relates to an apparatus and method for remotely repairing existing underground pipe junctions from the inside-out, as opposed to digging a trench and replacing or repairing the pipe from the outside-in.

BACKGROUND OF THE INVENTION

Sewer lines, water lines and other types of buried pipelines can develop leaks over time. These leaks are a result of decaying materials such as the clay used in the construction of the pipeline, obstructions which may clog a line, chemical exposure or crushing due to overburden pressure due to the inferior materials used in very old pipelines. Many older lines require repair to prevent exterior leaking and possible ground water contamination. Additionally, without proper repair ground water can infiltrate into the broken sewer lines, thus causing significant increase in the volume of throughput and the expense of chemicals and other materials used for treatment of the sewer water.

Repairing leaking sewer lines and other forms of fluid transmission lines is very expensive due to the previous necessity of digging a trench from the surface to physically remove the pipe. The removal and replacement of this pipe from the surface is time-consuming, expensive and not practical in many old commercial and residential neighborhoods due to narrow alleyways, heavy traffic and the volume of pipe located below existing buildings or other obstructions.

Thus, "trenchless technology" was developed which utilizes machinery and methods of repairing sewer pipe and other buried transmission lines from the inside-out. This process eliminates the need for digging expensive trenches aboveground. In brief, the existing main pipeline is repaired by installing a plastic liner which is inserted into the existing pipeline. The plastic liner is then bonded to the internal surface of the existing pipeline by heating or other methods. The existing lateral service lines which feed the main pipeline are then located by the use of a robotic device with an optical camera. Once identified, a hole is drilled by the robot mechanism into the existing pipeline, thus providing access into the lateral service line.

Unfortunately, the hole drilled into the existing lateral service line does not provide a satisfactory seal, thus permitting significant volumes of groundwater, as well as plant roots, dirt and other foreign objects to infiltrate the main pipeline at the junction point between the lateral service line(s) and the main pipeline. Additionally, contaminants within the main pipeline can potentially leak and pollute the adjacent groundwater. Thus, a need exists to provide a reliable patching mechanism to seal the junction point between the lateral service line and main pipeline which can be operated remotely and which functions from within the small internal confines of the main pipeline.

Others have attempted to seal the junction between the main pipeline and lateral service line, but known approaches have considerable disadvantages. U.S. Pat. No. 5,329,063 to Endoh exemplifies a technique where a flexible tubular liner is inserted into a lateral line so that the entire lateral line receives a lining. Air or liquid pressure is needed to insert the reversed flexible liner into the lateral. Once the liner is extended by the air pressure from the junction to the other end of the lateral pipe, access to that other end of the lateral line is required to cut away any excess liner. In this way, the entire lateral pipe is lined from one end to the other.

As those skilled in the art can appreciate, installing a flexible liner in a lateral service line is very time consuming and difficult. The apparatus required for installation has many moving parts and is complex to operate. Additionally, access to the distal end of the lateral line (i.e., the end away from the main pipeline) is needed to cut away the excess liner. The complex setup required makes sealing the junction of the main pipeline and lateral service line both time consuming and expensive.

Further, the results achieved by the flexible liners are erratic because the lateral service line is not a controlled environment. For example, the lateral may contain debris which will obstruct the flexible liner so that when the liner is hardened, the obstructions will permanently interfere with the flow in the lateral line. Additionally, the environment in which the flexible liner must be installed into is subject to wide temperature swings which further encumbers achieving consistent results. Therefore, there is a need for quickly and inexpensively sealing the junction between a main pipeline and lateral service line with consistent results. This is especially needed in situations where it is difficult or impractical to obtain access to the distal end of a lateral service line.

SUMMARY OF THE INVENTION

It is thus one object of the present invention to provide an apparatus and method for sealing the junction point between a lateral service line and a main pipeline from the inside-out, i.e., using trenchless technology. Thus, in one aspect of the present invention a patching apparatus is provided which may be positioned and installed with a robotic device within a main pipeline. The patching apparatus in one embodiment is comprised of a polyvinyl chloride (PVC) material, or the like, having a flange which is shaped to fit the internal diameter of the main pipeline and an extending stem which penetrates into the lateral service line.

In another aspect of the present invention, the patching apparatus flange contains an interconnection substrate such as felt, sponge or another similar material to provide a resilient, compressible material suitable for sealing the pipe junction. The interconnection substrate may be impregnated with a bonding agent such as a water activated epoxy or grout which sealingly interconnects the patch to the main pipeline and lateral service line. Alternatively, an adhesive, glue, or other type of material may be applied to the interconnector substrate just prior to installation. To further provide sealing in another embodiment, an annular gasket may be positioned around the stem portion to promote sealing engagement between the stem and the internal surface of the lateral service line. The seal provided by the inverted-tee patch effectively eliminates most water intrusion or the influx of plant roots and other matter at the junction point which can seriously damage or obstruct the main pipeline.

It is yet another object of the invention to provide a remotely controlled robotic arm capable of applying the inverted-tee patch to the junction between the main pipeline and lateral service line from within the main pipeline. The robotic arm includes a support cage which holds the inverted-tee patch in place during insertion. The robotic arm laterally extends to apply the patch to the junction. Thus, in yet another aspect of the present invention a robotic arm is interconnected to a substantially elongated robot capable of traveling within a main sewer or other transmission line. The elongated robot is generally positioned by means of a remotely controlled assembly with an optical camera mechanism which properly identifies the junction point of the main pipeline and lateral service line.

It is yet another object of the present invention to provide a substantially rigid patch which does not require curing or the application of pressure to install the patch at the junction between the lateral service line and the main pipeline. Thus, the possibility of error is reduced since the patch is preformed and as such is not susceptible to deformation or failure as a result of non-controllable environmental factors such as debris in the pipeline, cold temperatures, etc. Furthermore, this type of patch does not require an entire service line to be lined, but only the junction point. Thus, significant time and expense can be saved while achieving a greater degree of reliability.

BRIEF DESCRIPTION OF THE DRAWINGS

FIG. 3 is a top view of a support cage which engages the inverted-tee patch;

FIG. 4 is an end view of the support cage of FIG. 3;

FIG. 5 is a side view of the support cage of FIG. 3;

FIG. 6 is a top view of an inverted-tee patch;

FIG. 7 is an end view of the inverted-tee patch of FIG. 6; and

FIG. 8 is a side view of the inverted-tee patch of FIG. 6.

DETAILED DESCRIPTION OF THE PREFERRED EMBODIMENT

The present invention generally relates to trenchless technology for the repair and reinforcement of pipes. More particularly, the present invention provides a method and an apparatus for installation of a patch to a junction between a lateral service line and a main pipeline.

Figure 1:
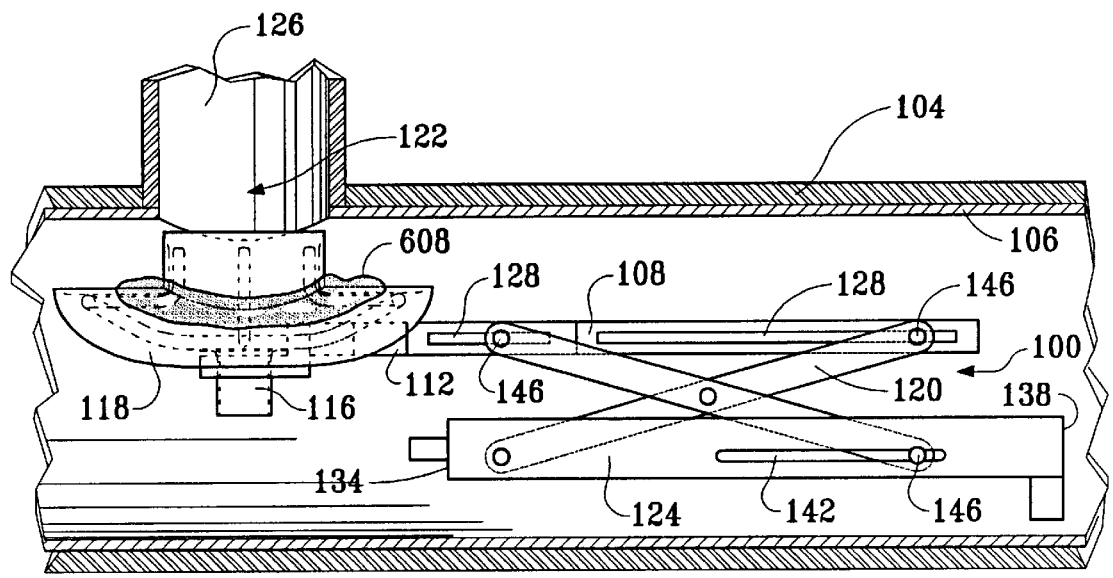
FIG. 1. is a side view of an robotic arm holding an inverted-tee patch immediately prior to insertion into a lateral.
Figure 2:
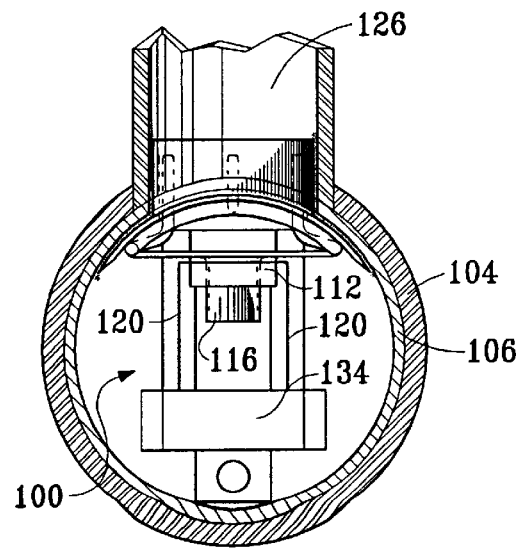
FIG. 2 is an end view of inverted-tee patch being installed into a lateral.

Referring to FIGS. 1 and 2, a side and end view of the robot mechanism 100 within a main pipeline 104 are respectively shown. The robot mechanism 100 includes an upper platform 108, an extension arm 112, a support cage 116, scissor multipliers 120, a lower platform 124, and a slide (not shown). The robot mechanism 100 attaches to a power assembly (not shown) which remotely activates the scissor multipliers 120 and rotates the robot mechanism 100.

The upper platform 108 at a forward end 130 is fixedly attached to the extension arm 112 which engages the support cage 116. The support cage 116 is adapted to removably hold a patch 118 in place for insertion into a lateral service pipe 126. The patch 118 in profile is shaped like an inverted-tee (see FIG. 8). Any overextension of the lateral service pipe 126 beyond an inner surface of the main pipeline 104 is typically ground away prior to insertion of the patch 118 so that the patch will mount flush within an inner surface of the pipeline 104, as further described below. Each side of the robot mechanism 100 has a scissor multiplier 120 which allows lateral extension. Two slots 128 on each end of the upper platform 108 engage each scissor multiplier 120.

The lower platform 124 and attached slide is typically positioned near the bottom of the pipeline and provides support for the scissor multiplier 120 and upper platform 108. A front end 134 of the lower platform 124 is attached to the slide which supports the front end while allowing it to easily move back and forth within the pipeline 104. A rear end 138 of the lower platform 124 attaches to the power assembly which has a scissor motor (not shown) and a rotation motor (not shown). The scissor motor activates the scissor multiplier 120 to change the elevation of the upper platform 108 with respect to the lower platform 124. The rotation motor rotates the robot mechanism 100 with respect to the power assembly. By rotating the robot mechanism 100, lateral lines not vertically aligned with the flow in the main pipeline 104 become aligned with the support cage 116.

The scissor multiplier 120 contracts and expands to respectively raise and lower the upper platform 108 with respect to the lower platform 124 under the control of the scissor motor. It is once again noted, there are two scissor multipliers 120 on opposite sides of the platforms 108, 124 (see FIG. 2). Slots 128 on the upper platform 108 and a slot 142 on the lower platform 124 engage the scissor multiplier 120. When the scissor multiplier 120 contracts and expands, pins 146 slide move within the slots 128, 142. As shown in FIG. 2, the patch is inserted into the lateral line 126 when the scissor multiplier 120 contracts from the partially expanded position depicted in FIG. 1.

Referring to FIGS. 3 through 5, the support cage 116 which removably holds the inverted-tee patch 118 is shown. The support cage includes a cylindrical stem 300, a cross member 304, an oval support 308, top and bottom talons 312, 316, and first and second talons 320, 324. The stem 300 mates with the extension arm 112 of the robot mechanism 100 for support. The cylindrical stem 300 is rigidly attached to a center of the cross member 304. Each end of the cross member 304 is rigidly attached to the oval support 308. To properly contour to the shape of the patch 118 and the inside of the pipeline 104, the oval support 308 when viewed from the end (see FIG. 4) is convex. The talons 312, 316, 320, 324 are connected on one end to the oval support 308 and shaped to removably mate with the inverted-tee patch 118. In this embodiment, only gravity keeps the patch 118 attached to the support cage 116, but other methods could also be used.

With reference to FIGS. 6 through 8, the inverted-tee shaped patch 118 is illustrated. Included in the patch 118 is a tubular stem 600, a convex flange 604, and an interconnection substrate 608 (shown in FIG. 1). In a preferred embodiment the substrate may be impregnated with an epoxy, resin, glue or other type of attachment mechanism. The tubular stem 600 mates to a circular cutout 620 in the flange. To avoid matter passing through the pipeline 104 from snagging on the flange 604, the edge of the stem is preferably beveled 616 toward the pipeline 104. The patch 118 is designed to seal the junction 122 between the main pipeline 104 and lateral service line 126. When the patch 118 of this embodiment is properly installed, the tubular stem 600 is mated inside the lateral line 126, the convex flange 604 is coextensive with an inner surface of the main pipeline 104, and the impregnated interconnection substrate 608 affixes the patch 118 to the junction 122. The patch 118 prevents cross-contamination between the material outside the pipes and the material inside the pipes. Preferably, the flange 604 is formed to fit the inner circumference of the main pipeline 104 and occupies a portion of the circumference equal to or greater than one and one-half times a diameter of the lateral line 126, although various shapes and sizes of the flange may be used as appreciated by one skilled in the art.

The interconnection substrate 608 (See FIG. 1) affixes the patch 118 to the pipe junction 122. To absorb epoxy or grout, the interconnection substrate 608 made of sponge, felt or the like, and is attached to a bonding surface 612 of the flange 604. Having the interconnection substrate 608 be absorbent allows easy transport of the epoxy which might otherwise drip off the flange 604. Additionally, the interconnection substrate 608 provides an additional barrier to prevent leakage at the junction 122. As can be appreciated by one skilled in the art, the junction 122 may have imperfections which would prevent epoxy alone from effectively sealing, but the deformable interconnection substrate 608 conforms to any imperfections to provide a better seal. The interconnection substrate is preferably able to compress to about one-third or less of its original thickness during installation. Preferably, the interconnection substrate 608 is a sponge material of a thickness greater than 5 mm which is impregnated with a liquid epoxy. In other embodiments, the impregnated interconnection substrate 608 can be anything which bonds the patch 188 to the junction 122 and substantially prevents foreign matter, including water, from seeping into the pipes 104, 126. In another embodiment, the interconnection substrate 608 is used in conjunction with an annular gasket on the stem 600 to provide improved sealing between the stem and the lateral service line 126 to help prevent seepage into the main pipeline 104.

The following discusses a method of using the aforementioned robot mechanism 100, support cage 116 and patch 118 to perform a patching operation. The first step requires identifying the lateral service line 126 requiring a patch 118 after the installation of a liner in the main pipeline 104. Identification may be done visually by an operator or remotely using a video camera or other sensing device. Once the lateral service line 126 is identified, access is provided to the lateral service line 126 by drilling a hole through the liner with the use of a remotely controlled drill attached to a robotic apparatus which is pulled through the main pipeline 104. If the lateral line 126 overextends into the main pipeline 104, the excess can be trimmed with a robotic grinder or the like.

The patch 118 is typically prepared for attachment and placed on the support cage 116 before inserting the robot mechanism 100 into the main pipeline 104. This preparation may require attaching the interconnection substrate 608 to the bonding surface 612, at an earlier time, and applying the epoxy or grout to the interconnection substrate immediately prior to use. Alternatively, the substrate 608 may be pre-attached to the exterior surface of the flange and in a preferred embodiment, may be pre-impregnated with a glue or epoxy. The epoxy or grout typically has a viscus consistency for a period of time before hardening upon exposure to a catalyst. The catalyst for the hardening process may be air, heat, water, or any other suitable technique known in the art. Placing the patch 118 on the support cage 116 is typically performed before the robot mechanism 100 is inserted into the pipeline 104 because after insertion there may not be sufficient clearance between the pipeline wall and support cage 116.

In the next step, the support cage 116 holding the inverted-tee patch 118 is positioned so that when the support cage 116 is laterally extended, the patch 118 will mate with the lateral service line 126. This may require dragging the robot mechanism 100 and attached power assembly so that the patch 118 is longitudinally aligned in the main pipeline 104 with the lateral service line 126. Often, the lateral service line 126 is not aligned vertically with respect to the flow in the main pipeline 104. Under these circumstances, the power assembly activates its rotation motor to angularly align the patch 118 with the junction 122.

Once the patch 118 is properly positioned, the power assembly activates the scissor motor to contract the scissor multiplier 120. The contraction of the scissor pushes the support cage 116 and patch 118 toward the lateral line 126. In this way, the tubular stem 600 is inserted inside the lateral line 126 and the convex flange 604 is aligned with the inside of the main pipeline 104. The patch 118 is held in place with sufficient force until the epoxy or grout cures. Pressure is provided to the support cage 116 so that the interconnection material 608 is compressed to sufficiently fill-in any imperfections in the junction with interconnection substrate 608. In one embodiment, curing takes approximately 25 minutes. After curing, the epoxy or grout applied to the interconnection substrate 608 optimumly produces a water-tight seal between the lateral service line 126 and main pipeline 104 and holds the patch 118 rigidly in place.

After the scissor multiplier 120 is expanded to move the support cage 116 away from the patch 118 affixed to the junction 122, the robot mechanism 100 and power assembly are free to be removed from the pipeline 104. In this way, a patch 118 may be used to seal the pipe junction 122.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. An apparatus adapted for removable interconnection to a remotely controlled robot for insertion into a main pipeline to sealingly repair a junction between a main pipeline and a lateral service line, comprising:

a patch comprising:
      a substantially rigid tubular stem having a first end and a second end, the second end having a substantially open aperture for communication with the lateral service line;
      a convex flange having an exterior surface, an interior surface and a cutout portion operatively sized and interconnected to the first end of said tubular stem, wherein said tubular stem extends away from the exterior surface of said convex flange; and
      sealing means interconnected to the exterior surface of said convex flange having resilient deformation properties adapted to provide sealing engagement between said convex flange and an interior surface of the main pipeline; and
   a support cage adapted for removable interconnection to the interior surface of said convex flange, said support cage having a first end adapted for interconnection to the remotely controlled robot and a second end having a shape which operatively nests with the interior surface of said convex flange to provide a sufficient uniform force to compress said sealing means between the exterior surface of said convex flange and the interior surface of the main pipeline.

2. The apparatus of claim 1, wherein said convex flange is substantially rigid.

3. The apparatus of claim 1, wherein the exterior surface of said convex flange is contoured to have a shape substantially coextensive with the interior surface of the main pipeline.

4. The apparatus of claim 1, wherein said convex flange covers a portion of a circumference of the main pipeline at least 1.5 times a diameter of the lateral service line.

5. The apparatus of claim 1, wherein said tubular stem has a first length less than a second length of the lateral service line.

6. The apparatus of claim 1, wherein said tubular stem has a first length less than half a second length of the lateral service line.

7. The apparatus of claim 1, wherein said tubular stem has a first length less than a diameter of the main pipeline.

8. The apparatus of claim 1, wherein substantially an entire length of said tubular stem is comprised of a rigid material both before and after insertion of said tubular stem into the lateral service line.

9. The apparatus of claim 1, wherein said sealing means substantially surrounds the cutout portion of said convex flange.

10. The apparatus of claim 1, wherein said sealing means is comprised of foam rubber, felt, rubber, synthetic polymer, sponge, or cloth.

11. The apparatus of claim 1, wherein said sealing means has an uncompressed thickness of at least 5 mm.

12. The apparatus of claim 1, wherein said sealing means has a compressed thickness of less than about one-third of an uncompressed thickness.

13. The apparatus of claim 1, wherein said sealing means further comprises an annular gasket positioned on an exterior surface of said tubular stem wherein a seal is provided between said tubular stem and an interior surface of the lateral service line.

14. The apparatus of claim 1, wherein said patch further comprises an adhesive means interconnected to or impregnated within said sealing means.

15. The apparatus of claim 1, wherein said support cage comprises:
   a support ring, and
   a plurality of talons having a first end and a second end interconnected to said support ring, said support ring formed to operatively engage the interior surface of said convex flange.

16. An apparatus adapted for removable interconnection to a remotely controlled robot for insertion into a main pipeline to sealingly repair a junction between a main pipeline and a lateral service line, comprising:
   a patch including:
      a tubular stem having a first end, a second end and a first length, wherein the second end has a substantially open aperture for communication with fluids traveling in the lateral service line;
      a convex flange having an exterior surface, an interior surface and a cutout portion operatively sized and interconnected to the first end of said tubular stem wherein the second end of said tubular stem extends away from the exterior surface of said convex flange; and
      a sealing substrate interconnected to the exterior surface of said convex flange proximate to said tubular stem and having resilient deformation properties adapted to provide sealing engagement between the exterior surface of said convex flange and an interior surface of the main pipeline; and
   a support cage adapted for removable interconnection to the interior surface of said patch, wherein said support cage has sufficient structure to provide an adequate force to compress said sealing means.

17. The apparatus of claim 16, wherein the first length of said tubular stem is less than half a second length of the lateral service line.

18. The apparatus of claim 16, wherein the first length of said tubular stem is less than a diameter the main pipeline.

19. The apparatus of claim 16, wherein the first length of said tubular stem is substantially rigid both before and after insertion into the lateral service line.

20. The apparatus of claim 16, wherein said sealing means has an uncompressed thickness no greater than about 1 inch.

21. The apparatus of claim 16, wherein said patch further comprises an adhesive means interconnected to or impregnated in said sealing means to provide attachment to the interior surface of the main pipeline.

22. A method for remotely installing a patch to an underground junction between a main pipeline and a lateral service line, comprising the steps of:

(a) providing a patch comprising:
      a tubular stem having a first end, a second end and a first length, wherein the second end has a substantially open aperture for communication with the lateral service line:
      a convex flange having an exterior surface, an interior surface and a cutout portion operatively sized and interconnected to the first end of said tubular stem wherein the second end of said tubular stem extends away from the exterior surface of said convex flange; and
      sealing substrate interconnected to the exterior surface of said convex flange having resilient deformation properties adapted to provide sealing engagement between said convex flange and an interior surface of the main pipeline;

(b) determining a location of the junction between the main pipeline and the lateral service line;

(c) removably attaching said patch to a support cage;

(d) positioning said support cage beneath the location of the underground junction;

(e) activating a lateral extender to move said support cage from a first traveling position to a second engagement position so that said patch is positioned with said tubular stem within the lateral service line and said convex flange juxtapositioned against an internal surface of the main pipeline;

(f) curing said patch so that said patch becomes fixedly connected to the internal surface of the main pipeline wherein said patch substantially prevents infiltration of foreign matter into the main pipeline at the underground junction;

(g) deactivating the lateral extender to move said support cage from the second engagement position to the first traveling position; and (h) removing by means of a remote control said lateral extender and said support cage from the main pipeline.

23. The method for installing a patch of claim 22, wherein said tubular stem has a first length less than half a second length of the lateral service line.

24. The method for installing a patch of claim 22, wherein substantially an entire length of said tubular stem is substantially rigid both before and after insertion into the lateral service line.

25. The method for installing a patch of claim 22, wherein said patch further comprises an adhesive means interconnected to or impregnated within said sealing substrate for interconnecting said substrate to the interior surface of the main pipeline.

* * * * *